Feb. 4, 1930. E. W. SEEGER 1,745,510
CIRCUIT CONTROLLING APPARATUS
Filed Aug. 17, 1925
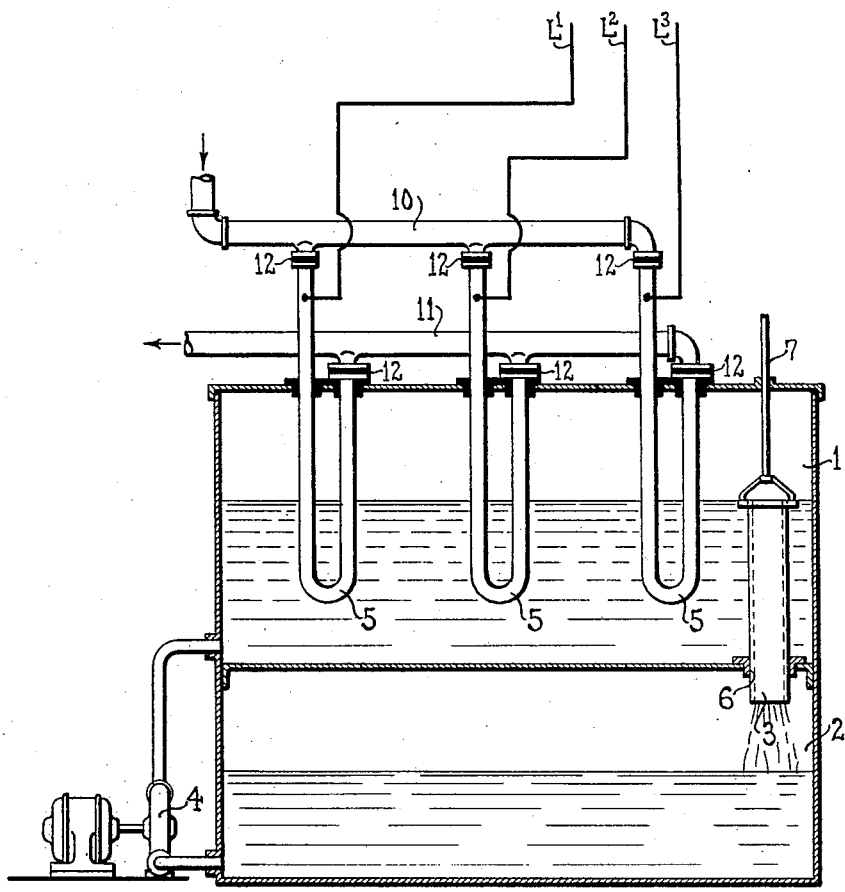
INVENTOR.
Edwin W. Seeger
BY Frank H Hubbard
ATTORNEY.

Patented Feb. 4, 1930

1,745,510

UNITED STATES PATENT OFFICE

EDWIN W. SEEGER, OF MILWAUKEE, WISCONSIN, ASSIGNOR, BY MESNE ASSIGNMENTS, TO CUTLER-HAMMER, INC., A CORPORATION OF DELAWARE

CIRCUIT-CONTROLLING APPARATUS

Application filed August 17, 1925. Serial No. 50,557.

This invention relates to circuit controlling apparatus and more particularly to liquid rheostats.

As is well known, the resistance of a liquid rheostat diminishes rapidly with an increase in temperature of the electrolyte and any means, therefore, which provides for rapid dissipation of the heat generated in the elecrolyte serves to increase the capacity of the rheostat.

The general object of the present invention is to provide a liquid rheostat having improved means associated therewith for cooling the same.

Another object is to provide a liquid rheostat having cooling means associated therewith which provides for circulation of the electrolyte to prevent spitting or gassing adjacent the electrodes.

Various other objects and advantages of the invention will hereinafter appear.

The principles of the invention will be set forth in connection with the accompanying drawing, which schematically illustrates a water rheostat equipped with cooling means constructed in accordance with the invention.

The rheostat shown in the drawing comprises a main electrode containing tank 1, an auxiliary electrolyte supply tank 2, a hollow cylindrical valve 3 for controlling the level of the electrolyte in tank 1, a motor driven pump 4 for supplying electrolyte from tank 2 to tank 1 and a plurality of electrodes 5, disposed in side-by-side relation within the tank 1. Valve 3 is slidably mounted within an outlet port 6, and is adapted to be adjusted by a rod 7 which is controlled by a suitable operating mechanism (not shown). The lower portion of the valve 3 closes the port 6, and the electrolyte which is supplied from the tank 2 to the tank 1 by the pump 4 flows over the top and through the hollow valve 3 to tank 2. The level of the electrolyte therefore corresponds to the position of the valve 3 and by raising and lowering said valve the degree of immersion of the electrodes 5 can be varied as desired.

Electrodes 5 may be supported in any suitable manner within the tank 1 and as is understood any number of electrodes may be employed; the rheostat illustrated being designed for control of the three phase circuit indicated by lines $L^1$, $L^2$ and $L^3$. The electrodes illustrated in the drawing each comprises a U-shaped piece of pipe and means is provided for passing a cooling fluid through each of the same. As shown in the drawing, one end of each of the electrodes is connected to a pipe 10, while the opposite end of each is connected to a pipe 11, such connections being made by insulating couplings 12. The cooling fluid is supplied through pipe 10 and after passing through the electrodes is discharged through pipe 11. The cooling fluid may be either a gas or a liquid and may be pumped or otherwise supplied to the supply pipe 10.

It is apparent that with the electrodes supplied with a cooling medium in the manner above described, the heat generated in the rheostat will be rapidly dissipated. Furthermore it is apparent that, due to cooling of the electrolyte adjacent the electrodes, a rapid circulation of the electrolyte is obtained within tank 1. Such circulation of the electrolyte not only tends to maintain a uniform temperature throughout the electrolyte but also tends to prevent the accumulation of gases on the surface of the electrodes.

While the electrodes have been shown in the form of pipes, it is apparent that other forms of electrodes can be employed. For example the electrodes may consist of castings having cooling passages therein or the same may be formed from sheet metal.

What I claim and desire to secure by Letters Patent is:

1. In a rheostat the combination of a receptacle containing a fluid, electrodes in said fluid, each of said electrodes having a passage therein which is closed to the fluid within said receptacle and means for passing a cooling fluid through said passages.

2. In a rheostat the combination of a receptacle containing an electrolyte, electrodes in said electrolyte each having a passage therein which is closed to said electrolyte and means for passing a cooling fluid through the passages in said electrodes to cool the latter and said electrolyte and to also effect circulation of said electrolyte in proximity to said electrodes.

3. In a rheostat the combination of a receptacle containing an electrolyte, electrodes immersed in said electrolyte each of said electrodes having an opening within the same which is closed to the electrolyte within said receptacle, and means for effecting circulation of a cooling fluid within the openings in said electrodes.

4. In a rheostat the combination of a receptacle containing an electrolyte, electrodes immersed in said electrolyte said electrodes being hollow and having inlet and outlet passages above the level of said electrolyte, and means for passing a cooling fluid through said electrodes.

5. In a rheostat the combination of a receptacle containing an electrolyte, electrodes immersed in said electrolyte, said electrodes being hollow and having inlet and outlet passages above the level of said electrolyte, and means for passing a cooling fluid through said electrodes, said means including common inlet and outlet pipes secured to said electrodes and insulated therefrom.

6. In a rheostat, the combination of a receptacle containing a fluid, electrodes located within said receptacle, each having a passage therein which is closed to said fluid, means for passing a cooling fluid through the passages in said electrodes and means for varying the level of the fluid within said receptacle.

7. In a rheostat, the combination of a receptacle containing electrolyte, electrodes within said receptacle, each having a passage therein which is closed to said electrolyte, means for passing a cooling fluid through the passages in said electrodes to cool the latter and said electrolyte and to thereby effect circulation of said electrolyte in proximity to said electrodes, and means for varying the level of the electrolyte in said receptacle to vary the degree of immersion of said electrodes in said electrolyte.

In witness whereof, I have hereunto subscribed my name.

EDWIN W. SEEGER.